United States Patent

[11] 3,584,286

| [72] | Inventor | Ronald H. Randall |
| | | Cuba, N.Y. |
| [21] | Appl. No. | 883,070 |
| [22] | Filed | Dec. 8, 1969 |
| [45] | Patented | June 8, 1971 |
| [73] | Assignee | Acme Electric Corporation |
| | | Cuba, N.Y. |

[54] PHASE SHIFT CIRCUIT FOR PHASE CONTROLLED RECTIFIERS
21 Claims, 11 Drawing Figs.

[52] U.S. Cl............................................ 321/5,
321/18, 321/40, 321/47, 323/119
[51] Int. Cl....................................... H02m 7/12,
H02m 1/08
[50] Field of Search........................... 321/5, 7,
18, 38, 40, 47; 307/252, 90, 297; 323/119

[56] References Cited
UNITED STATES PATENTS
3,424,970  1/1969  Ross............................ 321/5
3,453,523  7/1969  Fair et al...................... 321/5

Primary Examiner—William H. Beha, Jr.
Attorney—Woodling, Krost, Granger and Rust ABSTRACT: A phase shift circuit for use with a controllable three-phase rectifier system wherein a frequency of 3 times the fundamental is generated, clipped, passed through an integrator to make a sinusoidal voltage and then amplified and limited to provide an alternating square wave at 3 times the fundamental frequency. Ramp voltages are developed with reset to zero at intervals in accordance with the square wave of voltage and these ramp voltages are compared with a variable DC voltage to achieve a phase shiftable initiation point for rectangular blocks of voltage to control the gating of the thyristors in the rectifier system.

INVENTOR.
RONALD H. RANDALL
BY Woodling, Krost,
Granger and Rust
ATTORNEYS.

3,584,286

PHASE SHIFT CIRCUIT FOR PHASE CONTROLLED RECTIFIERS

BACKGROUND OF THE INVENTION

In many phase shift controlled rectifier systems there are tuned circuits and when three phase or other polyphase rectifier systems are used, it is difficult to tune all three circuits to have closely identical characteristics. Additionally where three different ramp voltages are generated for the three phases it has been found extremely difficult to make all three of these ramp voltages of the same slope and with zero reset times at the proper periodic repetition rate. Still further input voltage transients of changes of the input AC voltage have caused considerable difficulty in prior art phase shift rectifier systems because such changes of input voltage are often passed completely through the system and appear as a transient in the rectifier output voltage. Also the prior art systems, because of tuned circuits including inductance, have experienced a time lag in effecting a phase shift and thus the phase shift circuit is often not sufficiently rapid in response to rapid changes. Still further many prior art phase shift circuits have had the disadvantage of difficulty of balance of phase shift among phases and this becomes especially critical with three or more phases.

Accordingly an object of the invention is to obviate the above-mentioned disadvantages.

Another object of the invention is to provide a phase shift circuit which utilizes operational amplifiers for high gain and accurate control of the output phase shiftable voltage.

Another object of the invention is to provide a phase shift circuit without any inductance and with practically instantaneous shifting of phase from 0° to 120° between one firing and the next of the thyristors in the rectifier system.

Another object of the invention is to provide a phase shift circuit which is immune to input noise on the alternating source voltage.

Another object of the invention is to provide a phase shift circuit which is immune to alternating input voltage amplitude variations.

Another object of the invention is to provide a phase shift circuit which is particularly easy to balance the phase shift among phases and which has a minimum of adjustments throughout the circuit.

SUMMARY OF THE INVENTION

The invention may be incorporated in a phase shift circuit operable from a polyphase alternating voltage source of $n$ phases, comprising in combination, frequency generator means including means to clip each of the phase voltages from the polyphase source to obtain a voltage alternating at a frequency $n$ times the fundamental frequency of the alternating voltage source, capacitor means, means connected to charge said capacitor means so that a ramp voltage is developed thereacross, means connecting said $n$ frequency voltage to periodically substantially short circuit said capacitor means at a repetition rate $n$ times said fundamental frequency, ramp detecting means including a variable control voltage, and means to compare said control voltage with said ramp voltage to obtain a phase shiftable voltage as said control voltage is varied in amplitude.

DESCRIPTION OF THE PREFERRED EMBODIMENT

Figure 1:
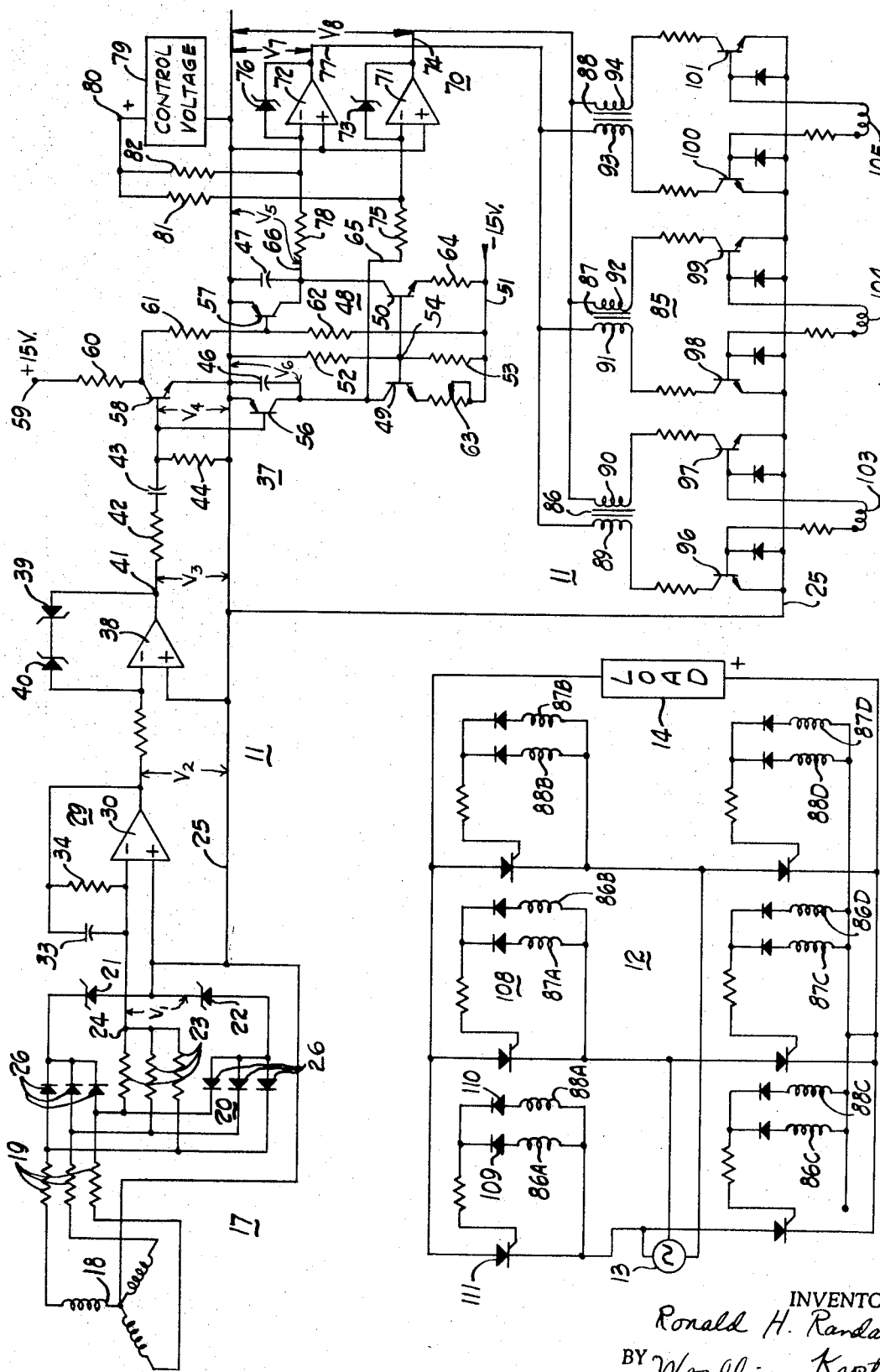
FIG. 1 is a schematic diagram of the preferred embodiment of the invention.

The FIG. 1 shows a schematic diagram of a phase shift circuit 11 although this is not the only circuit which may be devised to incorporate the novel features of the invention. The phase shift circuit 11 may be used with a polyphase rectifier system 12 shown as a three-phase full-wave thyristor rectifier operable from a three-phase voltage source 13 and supplying a rectified voltage to a load 14 which may be a battery to be charged, for example. The rectifier system may be of many different forms such as one with three thyristors and three diodes but the one shown includes six thyristors each of which is controlled as to firing angle.

The phase shift circuit 11 includes a frequency generator circuit 17 which receives a polyphase voltage, in this case a three-phase voltage from a transformer 18 operable from the AC source 13. The phase voltages are passed through dropping resistors 19 to a full-wave rectifier 20 which includes six diodes 26 in a full-wave bridge circuit. Constant voltage dropping means are provided in the form of Zener diodes or breakdown diodes 21 and 22 connected in series across the output of the rectifier 20. Combining resistors 23 are connected together at one end at a terminal 24 and the other ends are connected respectively to different pairs of diodes in the full-wave rectifier 20. A conductor 25 is a ground conductor connected to the midtap or neutral of the input transformer 18. A first voltage $V_1$ appears between terminal 24 and conductor 25 as an output from this frequency generator 17 which generates a voltage at a frequency $n$ times the fundamental frequency of the alternating voltage source 13, where $n$ is the number of phases of source 13.

The phase shift circuit 11 further includes an integrator 29 which includes an operational amplifier 30, having the inverting input connected to the terminal 24. The noninverting input of this amplifier 30 is connected to ground conductor 25. A feedback capacitor 33 and feedback resistor 34 are connected in parallel from the output to the inverting input of this amplifier 30. The feedback capacitor 33 causes this operational amplifier 30 to act as an integrator. The input impedance of this amplifier 30 is very high and the output from the amplifier forces the current to flow in this feedback capacitor 33. The voltage across this capacitor 33 is then the integral of the amplifier input current, or is 90° lagging this input current. Accordingly, amplifier 30 acts as an integrator because the integral of the sine is the negative of the cosine and the cosine is 90° leading the sine. This voltage is inverted since the amplifier 30 is operating in the inverting mode. Accordingly the 90° lag becomes 90° lead. If the alternating voltage source 13 is at a frequency of 60 Hz. then this output of the integrator 30 is $n$ times or 3 times this frequency; namely, 180 Hz. The 90° lagging for the 180 Hz. is equal to 30 electrical ° for the 60 Hz.

The phase shift circuit 11 further includes a voltage ramp reset circuit 37. This circuit 37 includes an operational amplifier 38 with the negative input terminal thereof supplied with the voltage $V_2$ from the integrator 29. The positive input terminal is connected to the ground conductor 25. Breakdown diodes 39 and 40 are connected in series opposition around from the output to the negative input of this operational amplifier 38. The output from operational amplifier 38 appears on a conductor 41 as a voltage $V_3$ which is clipped, amplified and inverted relative to the voltage $v_2$. This voltage $V_3$ passes through a differentiating circuit including a resistor 42 and capacitor 43 connected in series and a resistor 44 connected across conductors 41 and 25. First and second capacitors 46 and 47 each have one end connected to the ground conductor 25 and the other ends are connected to capacitor charging means 48. This charging means 48 includes first and second constant current sources 49 and 50 illustrated as transistors operating from a regulated negative voltage source on a conductor 51. Resistors 52 and 53 are connected in series between conductors 25 and 51 and the bases of transistors 49 and 50 are connected to the junction 54 of these resistors to set the bias on these transistors and establish them as constant current sources. These transistors have the emitter collector path in series with the first and second capcaitors 46 and 47, respectively, to charge the respective capacitor so that a linear ramp voltage is developed thereacross. Transistors 56 and 57 are connected across the capacitors 46 and 47, respectively, to effectively short circuit the respective capacitor upon conduction. A triggering transistor 58 has its base connected to the junction of capacitor 43 and resistor 44. A positive voltage source is connected at terminal 59 which is connected through a resistor 60 to the collector of transistor 58. The emitter of this transistor 58 is connected to the ground conductor 25. The collector of transistor 58 is also connected through a resistor 61 and a resistor 62 to conductor 51 with the base of transistor 57 connected to the junction of resistors 61 and 62. The emitter of transistor 49 is connected through an adjustable resistor 63 to conductor 51 and the emitter of transistor 50 is connected through a resistor 64 to conductor 51. This voltage ramp reset circuit develops ramp voltages, in this case linear ramp voltages $V_5$ and $V_6$ across the second and first capacitors 47 and 46 which appear on conductors 66 and 65, respectively, relative to ground conductor 25.

The phase shift circuit 11 further includes a ramp detecting circuit 70 which includes operational amplifiers 71 and 72. A breakdown diode 73 is connected around amplifier 71 from the output conductor 74 thereof to the negative input terminal to which the conductor 65 is connected through an input resistor 75. Similarly, a breakdown diode 76 is connected around from the output conductor 77 of amplifier 72 to the negative input terminal thereof and to which conductor 66 is connected through an input resistor 78. A variable DC control voltage source 79 has a negative terminal connected to the ground conductor 25. Source 79 has a positive terminal 80 connected through input resistors 81 and 82 to the negative input terminals of operational amplifiers 71 and 72, respectively. The outputs of the ramp detecting circuit 70 appear on the conductors 74 and 77 relative to the ground conductor 25.

The phase shift circuit 11 further includes a gate anding circuit 85. This gate anding circuit distributes a pulse to gate a thyristor in the rectifier system 12 if that phase is positive and if the voltage on conductors 74 and 77 is also positive. In this gate anding circuit 85, pulse transformers 86, 87 and 88 are provided. Each of these pulse transformers has two primaries, one is for the positive phase and one for the negative phase. All the positive phase primary windings 89, 91 and 93 are connected to the conductor 74 and all the negative phase primaries 90, 92 and 94 are connected to the conductor 77. Referring to the first pulse transformer 86, the phase winding 89 is connected through the collector and emitter of a transistor 96 to the ground conductor 25. Transistors 97—101 are similarly connected in series with the remaining phase windings 90—94. Transformer secondary windings 103, 104, and 105 are connected to receive an alternating voltage of $n$ phases from the source 13. Transformer secondary 103 is connected between the bases of transistors 96 and 97. The transformer secondaries 104 and 105 are similarly connected to the bases of transistors 98—101.

The phase shift circuit 11 further includes a double gating and output circuit 108 arranged to gate their respective thyristors in the full-wave rectifier system 12. The pulse transformers 86, 87, and 88 each have four secondary windings designated by the suffix A, B, C, and D. These secondary windings are paired with two secondary windings from different phases in each pair, for example, secondary windings 86A and 88A are connected in series with diodes 109 and 110, respectively, and these two series combinations are connected in parallel across the gate and cathode of thyristor 111 of rectifier system 12. Similar circuit arrangements are provided for the other five thyristors in the rectifier system 12. Also, other rectifier systems than the one shown may be gated by this output circuit 108.

OPERATION

The phase shift circuit 11 is used to control the phase shift of the gating signals applied to the thyristors of the rectifier system 12 so that this rectifier system will have a variable DC output voltage to the load 14. The polyphase voltage source 13 is illustrated as a three-phase voltage with rectifier system 12 accordingly being a three-phase full-wave bridge circuit. If the source 13 has a fundamental frequency of 60 Hz. Then the rectifier system 12 needs to have a phase shiftable voltage of 120° in order to change from zero voltage output to maximum voltage output to the load 14. This phase shift circuit 11 provides this 120° phase shift.

Figure 2:
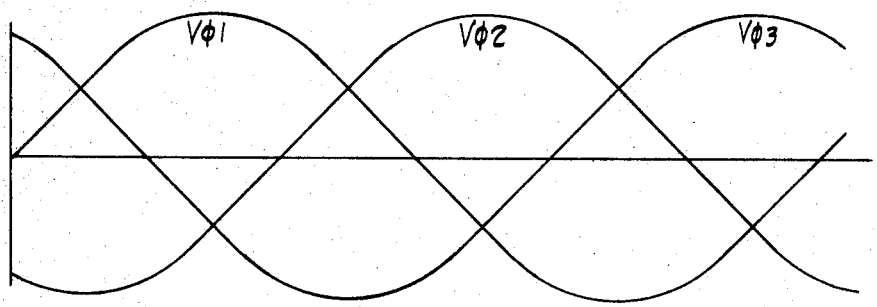
FIGS. 2—11 are voltage versus time diagrams illustrating the operation of the circuit.
Figure 3:
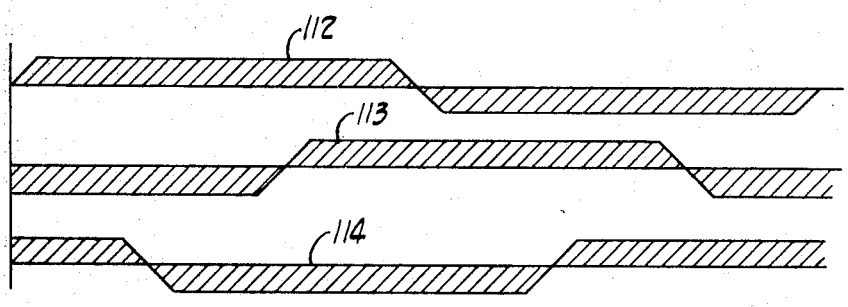
Figure 4:

The frequency generator circuit 17 generates a frequency equal to $n$ times the fundamental frequency of the source 13, in this case three times the frequency and with 60 Hz. source frequency the frequency generator circuit 17 will have an output frequency of 180 Hz. This frequency generator circuit 17 includes three single phase voltage clipper circuits. The breakdown diodes 21 and 22 set the clipped voltage level. The resistor 19 and the pair of diodes 26 connected to the first phase form the clipper circuit for this first phase. Similarly there is a dropping resistor 19 and pair of diodes 26 connected to each of the other two phases. FIG. 2 illustrates the phase voltages of the source 13 and of the transformer 18. Each of these phase voltages is clipped by the breakdown diodes 21 and 22 and these clipped voltages appear in FIG. 3 as voltages 112, 113, and 114, respectively. These are the voltages present relative to ground. These three voltages 112, 113, and 114 are summed through the summing resistors 23 at the terminal 24 so that the first voltage $v_1$ is represented in FIG. 4 by a curve 115. This voltage $V_1$ is the algebraic sum of the three voltages of FIG. 3. This voltage $V_1$ contains no fundamental frequency of 60 Hz. but the lowest frequency is the third harmonic; namely, 180 Hz. Thus all frequencies present in the voltage $V_1$ are 3 times the fundamental frequency, plus odd multiples thereof.

Figure 5:
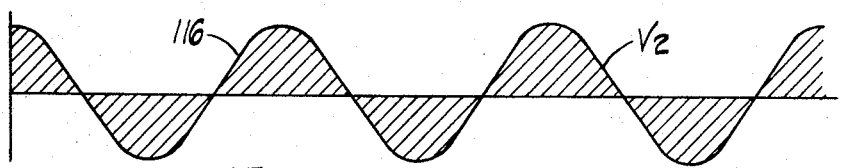

The integrator 29, because of the high input impedance of the amplifier 30 and the feedback capacitor 33, forces current to flow through the capacitor 33. The voltage across this capacitor is then the integral of the input voltage and is inverted to become 90° lagging in phase of the 180 Hz. signal, or 30° lagging of the 60 Hz. signal. Accordingly FIG. 5 shows the sineusoidal output voltage $V_2$ illustrated by curve 116 and shows that this voltage lags the voltage $V_1$ of curve 115 by 90° of the 180 Hz. signal. A full 120° phase shift of the thyristors in the solid phase rectifier system 12 is achieved, and this integrator 29 has the advantageous result of placing this range of phase shift of the output pulses from 30 electrical ° after a given phase passes through zero to 150° after that phase passes through zero. As will be seen from FIG. 2, these are the actual crossing points of the phase voltages and hence is the actual range required by the three-phase system for full control.

The voltage ramp resetting circuit 37 receives this voltage $V_2$ and applies it to the operational amplifier 38 which again is an inverting amplifier to greatly amplify this sinusoidal voltage $V_2$. The opposedly connected breakdown diodes 39 and 40 clip the top of this amplified wave so that a square wave alternating voltage $V_3$ is obtained on conductor 41 shown by curve 117 of FIG. 6. Because operational amplifier 38 is operated in the inverting mode, voltage $V_3$ is a square wave 180° out of phase relative to the voltage $V_2$. This voltage $V_3$ is then differentiated by resistor 42 and capacitor 43 to appear as a voltage $V_4$ shown in voltage curve 118 in FIG. 7. The positive going values of $V_3$ establish positive going spikes of voltage $V_4$. Conversely, the negative going values of $V_3$ establish the negative going spikes of $V_4$. Starting with time $t_0$ and ending with time $t_6$, the positive spikes are at $t_0$, $t_2$, $t_4$ etc. and the negative going values of $V_4$ are at $t_1$, $t_3$ and $t_5$. These positive going values of $V_4$ bias the triggering transistor 58 into conduction and the negative going values of $V_4$ bias transistor 56 into conduction. Thus transistors 58 and 56 are placed in conduction for short durations, three equally spaced for each cycle of the input frequency on source 13, or every 120°.

When transistor 56 is biased into conduction it shorts capacitor 46 bringing it to 0 volts. When transistor 58 is biased into conduction, it increases the voltage across resistor 60 and decreases the voltage across resistor 62, thus biasing transistor 57 into conduction. Transistor 57 shorts capacitor 47.

Figure 6:
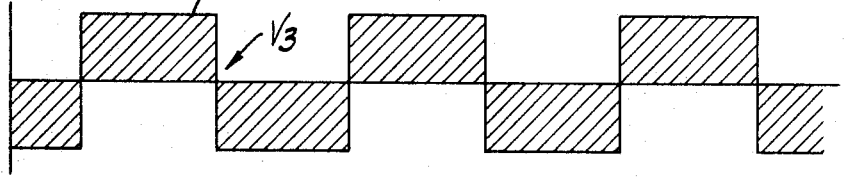
Figure 7:
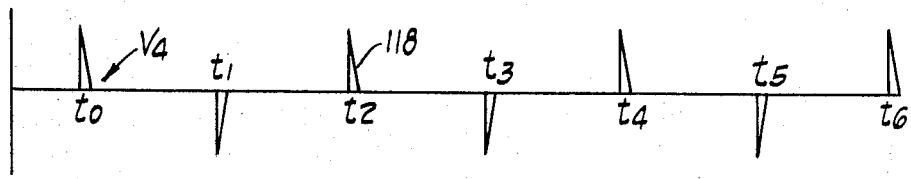

Referring again to the voltage $V_3$ shown in FIG. 6, when voltage $v_3$ goes positive, capacitor 47 is reset to zero, and when voltage $V_3$ goes negative, capacitor 46 is reset to zero. The capacitors 46 and 47 are alternately reset to 0 volts, one being reset every 180° of voltage $V_3$. Since 180° of $V_3$ represents 60 electrical ° of the input voltage, FIG. 2, one of the capacitors 46 or 47 is being reset every 60° of the voltage of source 13. Since one capacitor is reset every 360° of $V_3$, it is reset every 120° of the voltage of source 13.

The capacitor charging means 48 includes two current sources shown as constant current sources represented by the transistors 49 and 50. The resistors 52 and 53 set the base bias of these transistors to establish the constant current source.

Figure 8:
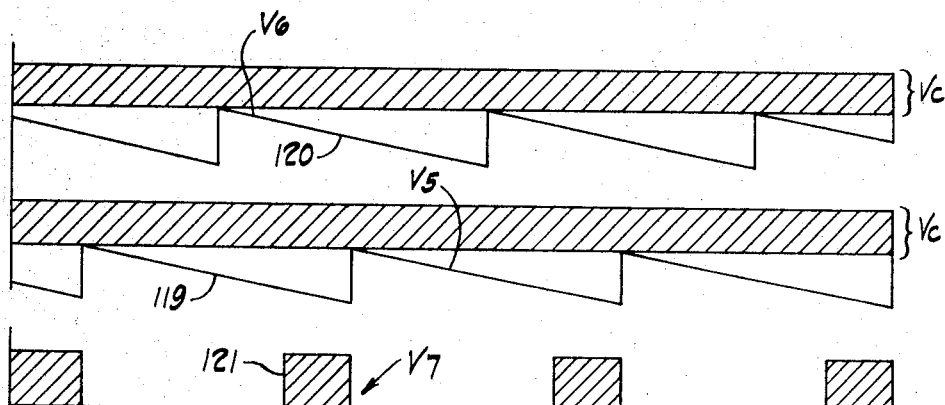

Resistors 63 and 64 are connected to the emitters of these transistors 49 and 50 and resistor 63, for example, may be made variable so that this simple adjustment will establish the constant current sources to be of equal charging rate on the capacitors 46 and 47. Since the voltage across a capacitor is equal to the integral of the current applied to it, the voltage across the capacitors becomes a linear ramp reset to zero by transistors 56 or 57 every 120° of the input fundamental frequency, in this example, 60 Hz. FIG. 8 shows a curve 119 of voltage $V_5$ appearing across capacitor 47 and shows a curve 120 of a voltage $V_6$ appearing across capacitor 46. These voltages $V_5$ and $V_6$ are ramp voltages, and in this case of use of constant current sources are linear ramp voltages reset to zero every 120° of the incoming line voltage. Voltages $V_5$ and $V_6$ are displaced 60° from each other.

Figure 9:
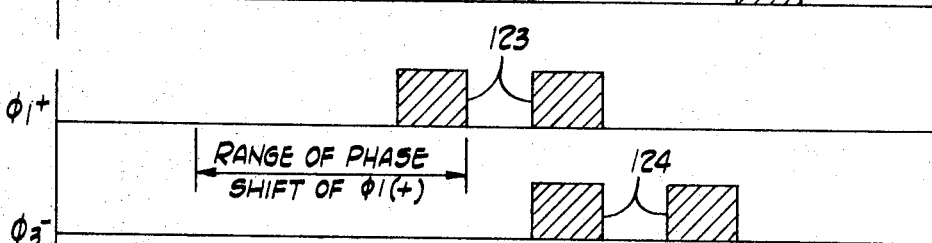

The ramp detecting circuit 70 utilizes the two operational amplifiers 71 and 72. The amplifier 72 in conjunction with resistors 78 and 82 together with breakdown diode 76 forms a comparator in which the voltage across capacitor 47 is compared with phase shift controlling voltage or DC control voltage 79. This is a control voltage $V_c$. If the algebraic sum of $V_c$ and $V_5$ is positive of zero then the output voltage $V_7$ is 0 volts. This voltage $V_5$ is shown in FIG. 9 as a curve 121 and this FIG. 9 also shows a curve 122 of a voltage $V_8$ appearing as an output from the operational amplifier 71. If the algebraic sum of $V_c$ and $V_5$ is negative of zero then the output voltage $V_7$ goes to a plus value of the breakdown voltage established by the breakdown diode 76. This FIG. 9 shows that the curve 121 of voltage $V_7$ is rectangular blocks of voltage with the termination time exactly equal to the flyback or reset times of voltage $V_5$. The initiation time of each rectangular block of voltage of $V_7$ may be observed from FIG. 8 to be that point whereat the negative amplitude of the voltage $V_5$ exceeds the positive amplitude of the phase shift control voltage $V_c$. This control voltage may be a manually variable voltage or it may be some feedback voltage controlled in accordance with a condition of the load 14. If the value of this control voltage $V_c$ is increased, voltage $V_7$ will be present for a shorter duration and if the voltage $V_c$ is reduced to zero, voltage $V_7$ will become a steady DC value of amplitude equal to the value of the breakdown diode 76. Thus as the value of $V_c$ is brought from 0 volts to the peak value of the ramp voltage $V_5$, then the leading edge of the voltage $V_7$ is phase shifted 120 electrical 20 of the input frequency. The operational amplifier 71 in conjunction with resistors 75 and 81 and the breakdown diode 73 forms a comparator for the voltages $V_c$ and $V_6$ to form the output voltage $V_8$. This circuit performs the same function as that of the comparator 72, but with the leading edges of voltage $V_8$ being 60 electrical ° displaced from that of voltage $V_7$.

The gate anding circuit 85 utilizes the voltages $V_7$ and $V_8$ to distribute pulses to gate the thyristors in sequence in the rectifier system 12. It is an AND gate because it distributes a pulse to gate a thyristor only if that particular phase is positive and if that voltage $V_7$ or $V_8$, whichever is associated with that phase, is positive. For example, if the first phase voltage $V_1$ is such that transistor 96 is biased on and if the voltage $V_7$ is positive then a pulse will be transmitted through pulse transformer 86 to gate the associated thyristor such as thyristor 111 associated with phase one positive. Likewise if transistor 97 is biased on and voltage $V_8$ is positive, then a pulse will be transmitted by pulse transformer 86 to the phase one negative. Identical circuits are arranged for phase 2 and phase 3 using pulse transformers 87 and 88, respectively. These pulse transformers 86, 87, and 88 are small pulse transformers set such that a sufficient volt-second area to gate the thyristors is transformed before saturation occurs. Resistors in series with the collectors of transistors 96—101 limit the current after saturation.

Figure 10:
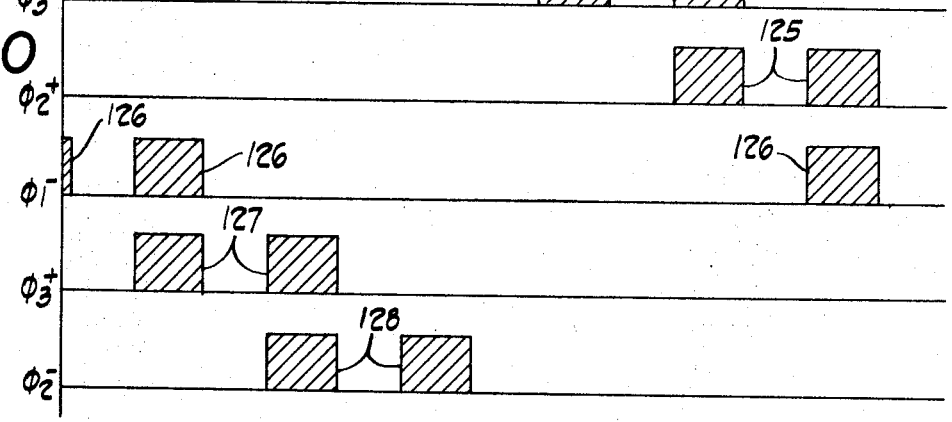
Figure 11:
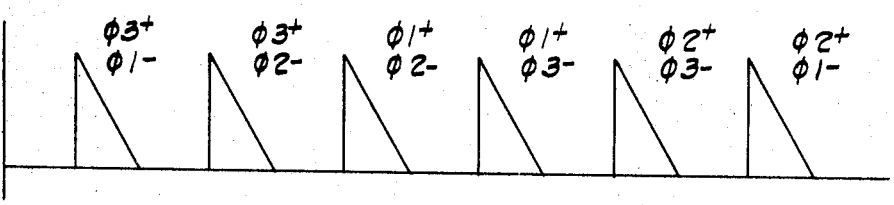

The double gating and output circuit 108 shows the interconnections of the secondaries of the pulse transformers 86, 87, and 88. FIG. 10 shows the gate signals of each of the six thyristors of the rectifier system 12. FIG. 10 shows voltage curves 123 of the phase I positive voltage and a voltage curve 124 the phase three negative voltage. As will be seen from FIG. 1, these are the two voltages applied to control gating of the thyristor 111 connected in the phase I positive of the rectifier system 12. FIG. 10 further shows voltage curves 125 of the phase 2 positive gate signal and a curve 126 of the phase I negative gate signal. Curve 127 is of the phase 3 positive gate signal and curve 128 is of the phase 2 negative signal. FIG. 11 shows an output voltage 129 of the rectifier system 12. This output voltage is shown with the two phases producing this voltage. Notice from FIG. 10 that each thyristor conducts for 30° then recovers for 30° then must conduct again. In order that a thyristor be capable of conducting again it must be regated with the next phase to be gated. Each of the gate signals 123—128 therefore has an identical pulse delayed from the initial pulse by 60°. This is done in the manner shown in the double gating and output circuit 108. The transformer secondary shown on the left such as secondary 86A is the gate associated with that phase and the right hand transformer secondary such as secondary 88A is the gate associated with the next phase to be gated. For example, thyristor 111 is first gated by secondary 86A and at this time it will be conducting with phase 2 negative, see voltage curve 128 of FIG. 10. Next phase 1 positive conducts with phase 3 negative as per curves 123 and 124 of FIG. 10. Therefore a secondary of the third pulse transformer 88 negative coil; namely, secondary 88A is also provided in the gating circuit of the phase 1 positive thyristor 111. Diodes 109 and 110 are connected in series with the pulse transformer secondaries 86A and 88A to prevent interaction between these two secondaries.

This phase shift circuit 11 provides a linear phase shift as a function of the control voltage $V_c$. The outputs of the gating circuits such as transformer secondaries 86A and 88A may be amplified if necessary to control larger thyristors for a larger amperage capacity rectifier system but in this FIG. 1 are shown as being connected to directly gate the thyristors.

The phase shift circuit 11 has a number of advantages one of which is that it is immune to input noise on the source 13 with a minimum of components. No tuned circuits are required since the line synchronizing circuit is operated at 3 times the input frequency. The absence of tuned circuits means the absence of any inductances. Many prior art phase shift circuits had three ramp voltages all operating at the fundamental frequency, for example, 60 Hz. The present circuit has only two ramp voltages, $V_5$ and $V_6$ operating at 3 times the fundamental frequency and thus this establishes the ease of balance because only one of these ramp voltages needs to be adjusted, for example, at the adjustable resistor 63 in order to have the same slope for these two ramp voltages. The circuit also provides an immunity to input voltage variations and amplitude. These two linear ramp voltages used for phase shifting are operated from a regulated minus 15 volt source on conductor 51 and are not a function of the input voltage from transformer input 18. Therefore changes on this input voltage will not produce phase shifts in the output pulses of voltages $V_7$ and $V_8$.

Another advantage of this circuit is that there is no time lag in the phase shift. The angle of phase shift can be changed from 0° to 120° from one thyristor firing to the next if the control voltage $V_c$ is step changed. Therefore no delays of phase shift are present in this circuit and this again is aided by an absence of inductive reactances in the circuit.

Another advantage is the ease of balance of the entire circuit. Because of the nature of this circuit with only two linear ramp voltages instead of three, a balance of the phase shift among phases may be obtained by only a single adjustment. This is achieved by relatively changing the values of resistors 63 and 64 and as shown, resistor 63 had been made adjustable.

Another advantage of the circuit is the fact that only minimal adjustment is required. Only one adjustment may be necessary for proper operation; namely, the balance adjustment just previously mentioned.

Where the phase shift circuit 11 is to be used with a simple rectifier system 12, for example, one containing three thyristors and three diodes, then the phase shift circuit 11 may be simplified. The secondaries of the transformers 86, 87, 88 with suffixes C and D would then not be needed. In some circuits it may be possible to eliminate one of the linear ramp voltages such as voltages $V_6$ and cause a linear ramp voltage $V_5$ to be periodically reset at a frequency equal to $n$ times the fundamental frequency where $n$ is the number of phases. This linear ramp voltage is obtained from the capacitor charging means 48 and where only one linear ramp voltage would be required this could be that capacitor 46 with its companion transistor 56.

The integrator 29 provides several advantages. A first advantage is that by using the amplifier 30 as an integrator, no input filters or band-pass filters are required, which in many prior art circuits required inductances. Inductances are undesirable because they produce a time lag making the entire circuit slow to respond to rapid changes. Also, filters are generally undesirable because with a change in input frequency this can seriously affect the operation of the circuit. A second advantage of using the integrator is that by the operation of integration, the output of amplifier 30 is phase-shifted 90° of the 180 Hz. signal, or 30 electrical ° of the 60 Hz. signal and this places the range of phase shift of the output pulses at the actual range required for full control. A third advantage is that since amplifier is not frequency sensitive, a wide deviation of input frequency has no affect and a constant phase lag input to output of amplifier 30 is produced regardless of input frequency. Previously on many prior art devices using tuned filters to pass the input frequency, a wide deviation of input frequency would produce phase shift in the output of the amplifier and this could seriously affect the operation of the phase circuit 11.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What I claim is:

1. A phase shift circuit operable from a polyphase alternating voltage source of $n$ phases, comprising in combination,
    frequency generator means including means to clip each of the phase voltages from the polyphase source to obtain a voltage alternating at a frequency $n$ times the fundamental frequency of the alternating voltage source,
    capacitor means,
    means connected to charge said capacitor means so that a ramp voltage is developed thereacross,
    means connecting said $n$ frequency voltage to periodically substantially short circuit said capacitor means at a repetition rate $n$ times said fundamental frequency,
    ramp detecting means including a variable control voltage,
    and means to compare said control voltage with said ramp voltage to obtain a phase shiftable voltage as said control voltage is varied in amplitude.

2. A phase shift circuit as set forth in claim 1, wherein said frequency generator means includes means to combine the clipped voltages to obtain the $n$ frequency voltage.

3. A phase shift circuit as set forth in claim 2, wherein said clipping means includes constant voltage drop means.

4. A phase shift circuit as set forth in claim 1, wherein said frequency generator means includes full wave rectifier means.

5. A phase shift circuit as set forth in claim 4, wherein said clipping means includes first and second constant voltage drop means,
    and said frequency generator means includes means to combine the voltages across first said constant voltage drop means to establish said first $n$ frequency voltage.

6. A phase shift circuit as set forth in claim 1, wherein said frequency generator means includes full wave rectifier means,
    dropping resistors connected between the phases of the polyphase source and said rectifier means,
    first and second breakdown diodes connected in series across the output of said rectifier means,
    a common lead connected between a neutral of said alternating voltage source and an $n$ frequency output terminal,
    and combining resistors connected in series with said dropping resistors between said alternating voltage source and a second $n$ frequency voltage output terminal to combine the clipped voltages to establish the $n$ frequency voltage.

7. A phase shift circuit as set forth in claim 1, wherein said capacitor charging means includes first and second capacitors,
    and means to alternately charge said first and second capacitors.

8. A phase shift circuit as set forth in claim 7, wherein said comparison means includes means to compare said control voltage with each of said ramp voltages across said first and second capacitors.

9. A phase shift circuit as set forth in claim 8, wherein said variable control voltage is a DC voltage,
    an amplifier connected as a comparator for each of said ramp voltages,
    and said comparison means includes input resistors connecting said control voltage and the respective one of said ramp voltages as inputs to a common input terminal of the respective amplifier to develop rectangular blocks of voltage passed by the amplifiers at a repetition rate equal to said $n$ frequency,
    the termination times of each of said rectangular voltage blocks being at time intervals equal to the reset points of the ramp voltages,
    and the initiation times of each of said rectangular blocks of voltage being variable in phase dependent upon the comparison of the amplitude of the control voltage with the amplitude of the ramp voltage at that instant.

10. A phase shift circuit as set forth in claim 1, including integrator means to establish a generally sinusoidal voltage from said $n$ frequency voltage.

11. A phase shift circuit as set forth in claim 10, wherein said integrator means includes an operational amplifier,
    and capacitive feedback means connected from the output to the input of said operational amplifier to cause said operational amplifier to act as an integrator to have the phase of the output voltage displaced from the phase of the input voltage.

12. A phase shift circuit as set forth in claim 1, including an operational amplifier connected to receive said $n$ frequency voltage,
    two breakdown diodes connected in series opposition around said operational amplifier to limit the amplifier output to a square wave alternating voltage,
    and means connecting the output of said operational amplifier to periodically substantially short circuit said capacitor means.

13. A phase shift circuit as set forth in claim 1, wherein said capacitor charging means includes constant current source means connected to charge said capacitor means so that a linear ramp voltage is developed thereacross.

14. A phase shift circuit as set forth in claim 13, including a transistor connected across said capacitor means,
    and means for effecting periodic conduction of said transistor to effect the periodic short circuiting of said capacitor means.

15. A phase shift circuit as set forth in claim 1, wherein said capacitor charging means includes first and second capacitors,
first and second constant current source means connected to charge said first and second capacitors, respectively, so that linear ramp voltages are developed thereacross,
and means connecting said $n$ frequency voltage to establish alternate short circuiting of said first and second capacitors each at an $n$ frequency repetition rate.

16. A phase shift circuit as set forth in claim 15, including a transistor connected across each of said first and second capacitors,
and means for effecting alternate conduction of said transistors to effect the alternate short circuiting of said first and second capacitors.

17. A phase shift circuit as set forth in claim 16, including a triggering transistor,
means connecting said $n$ frequency voltage to cause alternate conduction and nonconduction of said triggering transistor in accordance with the positive and negative half-cycles of the $n$ frequency voltage,
and means connecting said triggering transistor to establish alternate conduction periods of the transistors connected across said first and second capacitors,
whereby linear ramp voltages are established across said first and second capacitors with each ramp voltage being reset to zero at a repetition rate equal to the $n$ frequency,
and the voltage across the first and second capacitors being 180° out of phase.

18. A phase shift circuit as set forth in claim 1, for use with a thyristor rectifier system,
and gating means responsive to said phase shiftable voltage to cause selective firing of the thyristors in said rectifier system dependent upon the amplitude of the control voltage.

19. A phase shift circuit as set forth in claim 1, including means connected to said frequency generator means to shift the phase of the voltage supplied to said capacitor means.

20. A phase shift circuit as set forth in claim 19, wherein said phase shift means is an integrator.

21. A phase shift circuit as set forth in claim 19, wherein said integrator shifts the phase of the voltage by 90°.